United States Patent
Stewart et al.

(10) Patent No.: US 9,405,328 B2
(45) Date of Patent: Aug. 2, 2016

(54) TOUCH PAD FUNCTION MODIFICATION

(71) Applicant: LENOVO (Singapore) PTE, LTD., New Tech Park (SG)

(72) Inventors: Aaron Michael Stewart, Raleigh, NC (US); Xin Feng, Arcadia, CA (US); Masaki Matsubara, Sagamihara (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 207 days.

(21) Appl. No.: 13/712,808

(22) Filed: Dec. 12, 2012

(65) Prior Publication Data

US 2014/0160022 A1 Jun. 12, 2014

(51) Int. Cl.
*G06F 3/041* (2006.01)
*G06F 1/16* (2006.01)
*G06F 3/02* (2006.01)
*G06F 3/038* (2013.01)
*G06F 3/0354* (2013.01)

(52) U.S. Cl.
CPC .............. *G06F 1/169* (2013.01); *G06F 3/0213* (2013.01); *G06F 3/038* (2013.01); *G06F 3/03547* (2013.01)

(58) Field of Classification Search
CPC ........................................................ G06F 3/041
USPC ........................................................ 345/173
See application file for complete search history.

(56) References Cited

U.S. PATENT DOCUMENTS

| | | | |
|---|---|---|---|
| 2010/0245258 A1* | 9/2010 | Stewart et al. | 345/173 |
| 2010/0277419 A1 | 11/2010 | Ganey et al. | |
| 2011/0246719 A1 | 10/2011 | Know et al. | |
| 2012/0218187 A1* | 8/2012 | Stewart et al. | 345/168 |

* cited by examiner

*Primary Examiner* — Claire X Pappas
*Assistant Examiner* — Sepideh Ghafari
(74) *Attorney, Agent, or Firm* — Kunzler Law Group (57) ABSTRACT

For modifying touchpad function, a control module employs interim controls in an interim state for a touchpad in response to detecting use of a pointer embedded in a keyboard in a touchpad state. The control module further employs pointing controls in a pointing state in response to satisfying pointing criteria in the interim state. The control module also employs touchpad controls in a touchpad state in response to satisfying touchpad criteria in the pointing state.

20 Claims, 9 Drawing Sheets

TOUCH PAD FUNCTION MODIFICATION

FIELD

The subject matter disclosed herein relates to touchpads and more particularly relates to touchpad function modification.

BACKGROUND

Description of the Related Art

Button-less touchpads may include button zones that operate as controls. Such controls can be used with other pointing devices.

BRIEF SUMMARY

The inventors have recognized a need for an apparatus, method, and program product that modify touchpad function. An apparatus is disclosed for modifying touchpad function. The apparatus includes a computer readable storage medium and a control module. The computer readable storage medium stores machine readable code executable by a processor. The control module employs interim controls in an interim state for a touchpad in response to detecting use of a pointer embedded in a keyboard in a touchpad state. The control module further employs pointing controls in a pointing state in response to satisfying pointing criteria in the interim state. The control module also employs touchpad controls in a touchpad state in response to satisfying touchpad criteria in the pointing state. The method and program product also perform the functions of the apparatus.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more machine readable storage devices.

Any combination of one or more computer readable medium may be utilized. The computer readable medium may be a machine readable signal medium or a machine readable storage medium such as a computer readable storage medium. The machine readable storage medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of figures may refer to elements described in previous figures, like numbers referring to like elements.

Figure 1:
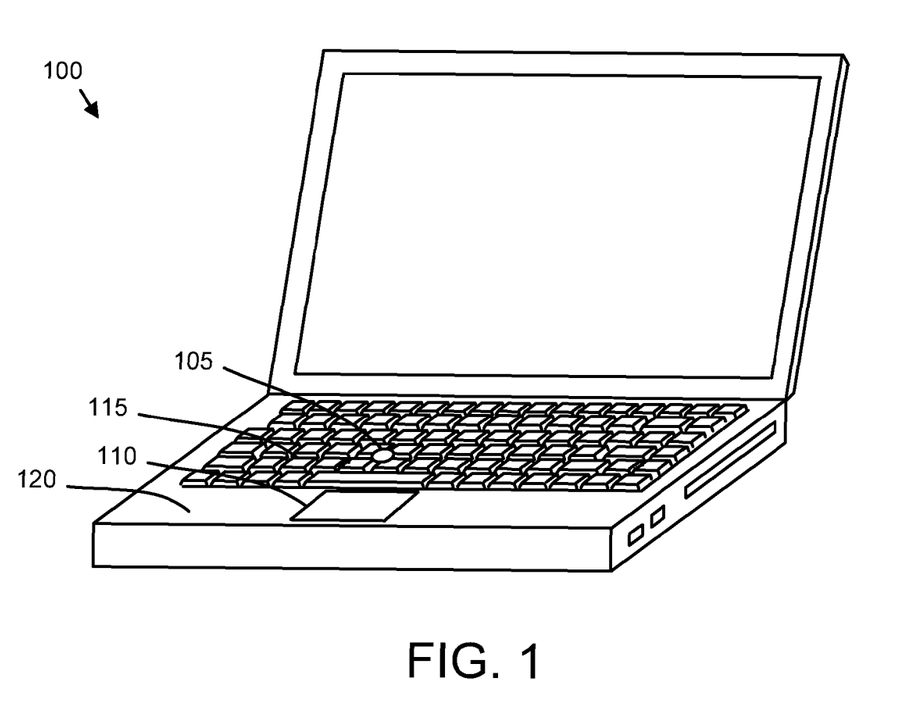
FIG. 1 is a perspective drawing illustrating one embodiment of a computer.

FIG. 1 is a perspective drawing illustrating one embodiment of a computer 100. The computer 100 may be a laptop computer. One of skill in the art will recognize that the embodiments may be practiced with other computer form factors that employ a touchpad 110. The computer 100 includes the touchpad 110, a keyboard 115, and a pointer 105 in a keyboard area 120. The pointer 105 may be a TrackPoint pointer 105 produced by Lenovo (Singapore) Pte. Ltd. The pointer 105 may employ a strain gauge or an optical sensor to convert motion into direction information.

The touchpad 110 may be used as a pointing device. The touchpad 110 may be a button-less touchpad 110. Alternatively, the touchpad 110 may include one or more control buttons.

The touchpad 110 may have areas that function as virtual buttons or controls. The controls may be activated within the touchpad 110 by a touching specified areas of the touchpad 110 as will be described hereafter.

When a user is employing the pointer 105, it may be advantageous to employ much of the area of the touchpad 110 as controls with various functions. The embodiments described herein may automatically modify the controls of the touchpad 110 to support the user's current mode of using the pointer 105 and the touchpad 110.

Figure 2:
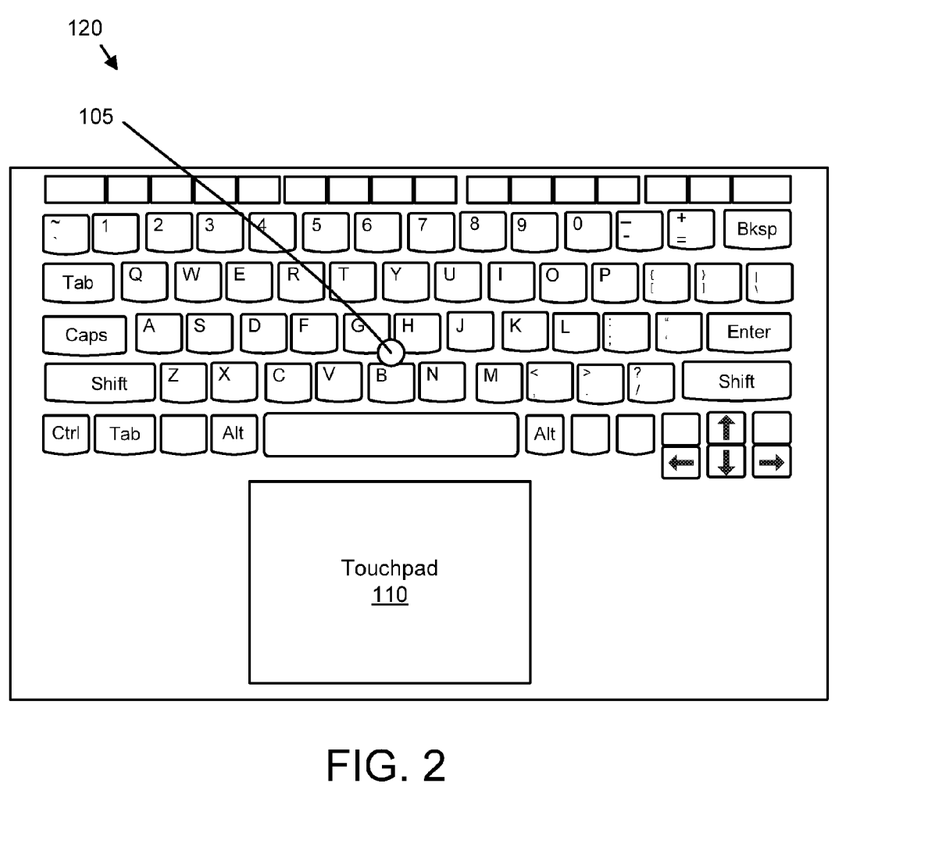
FIG. 2 is a top view drawing illustrating one embodiment of a keyboard.

FIG. 2 is a top view drawing illustrating one embodiment of the keyboard area 120. The keyboard area 120 is a keyboard area 120 of FIG. 1. The user may employ both the pointer 105 and the touchpad 110 within the keyboard area 120. The user may use the pointer 105 exclusively for pointing. The touchpad 110 may be used to provide controls and may not be required for pointing. As a result, the areas and/or functions of controls on the touchpad 110 may be modified to ease of use.

Figure 3:
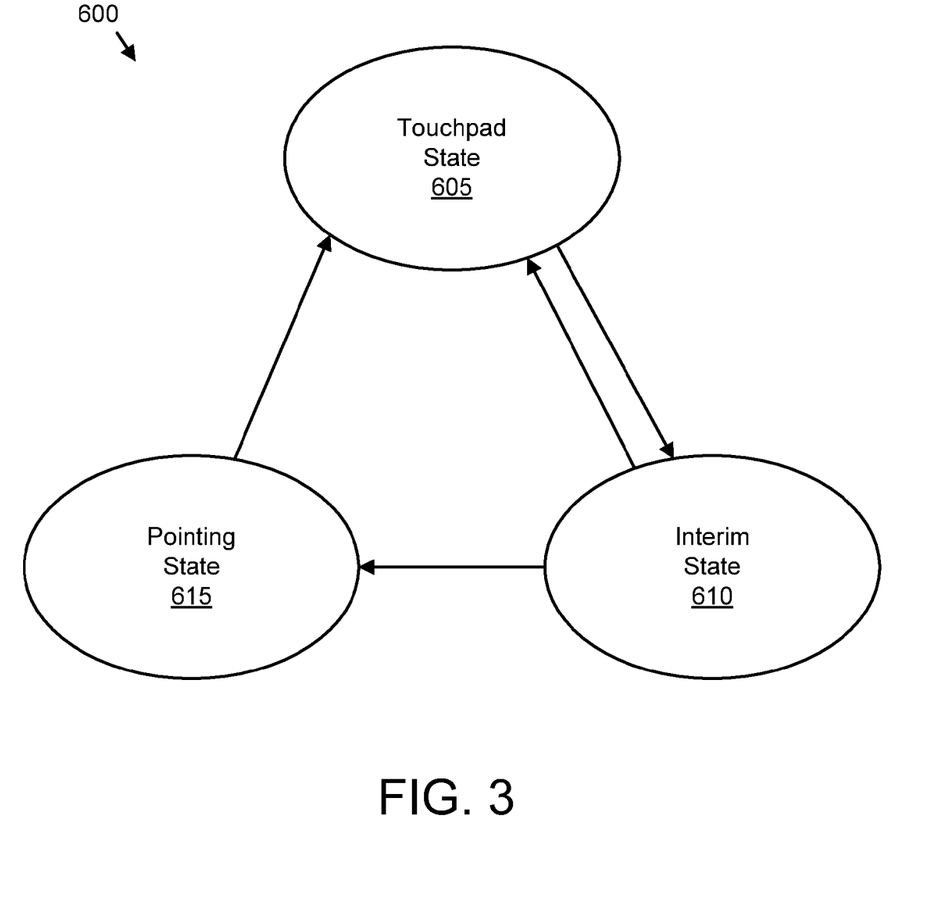
FIG. 3 is a schematic flow chart diagram illustrating one embodiment of control states.

FIG. 3 is a schematic flow chart diagram illustrating one embodiment of control states 600. Each state 600 is indicative of the controls that are available on the touchpad 110. The control states 600 include a touchpad state 605, an interim state 610, and a pointing state 615. In one embodiment, the touchpad state 605 is an initial state. For example the touchpad state 605 may be employed with the computer 100 is activated.

In the touchpad state 605, the touchpad 605 may function as a pointing device as well as provide controls. In one embodiment, touchpad controls, as will be described hereafter, are available on the touchpad 110 in the touchpad state 605.

In one embodiment, the touchpad state 605 transitions to the interim state 610 in response to detecting use of the pointer 105. In one embodiment, the touchpad state 605 transitions to the interim state 610 in response to a level of pointer use exceeding a pointer use threshold.

In the interim state 610, interim controls, as will be described hereafter, are available on the touchpad 110. The interim state 610 may transition to the touchpad state 605 in response to not satisfying pointing criteria in the interim state 610. The pointing criteria will be described hereafter. The interim state 610 may also transition to the pointing state 615 in response to satisfying pointing criteria in the interim state 610.

Pointing controls are available in the pointing state 615. The pointing controls are described hereafter. The pointing state 615 may transition to the touchpad state 605 in response to satisfying touchpad criteria in the pointing state 615.

Figure 4:
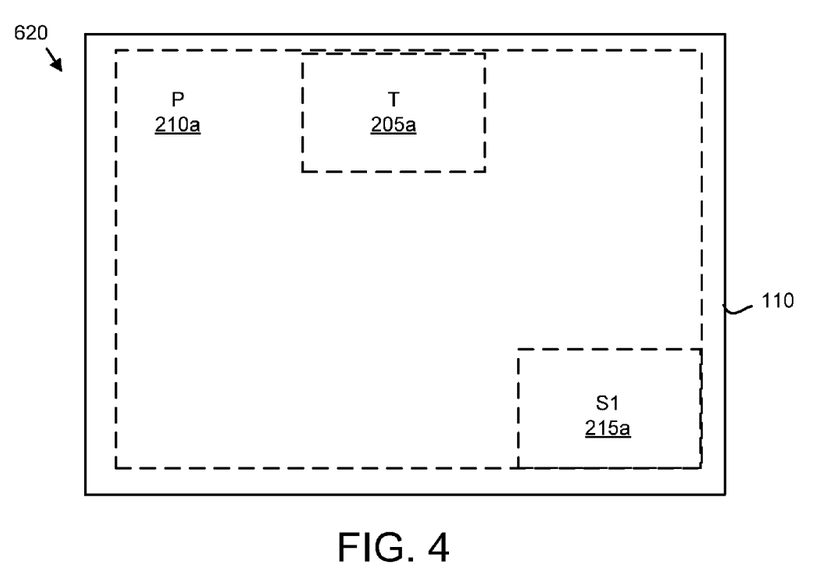
FIG. 4 is a top view drawing illustrating one embodiment of controls for a touchpad state.

FIG. 4 is a top view drawing illustrating one embodiment of the touchpad controls 620 for the touchpad state 605. The touchpad controls 620 include a primary button control 210a, a tertiary control 205a, and a first secondary button control 215a. In addition, the touchpad controls 620 may include a one finger tap, a two-three finger tap, a one-three finger count, a one finger scrolling region, a one finger drag, a two finger drag, a generic gesture, a one finger edge swipe, a w-value, and a key-time.

The primary button control 210a may be equivalent to a primary mouse button such as a left mouse button. The secondary button control 215a may be equivalent to a secondary mouse button such as a right mouse button. The tertiary control 205a may be equivalent to a tertiary mouse control such as a scroll wheel. In addition, the touchpad controls 620 may allow the touchpad 110 to receive the one finger tap, the two-three finger tap, the one-three finger count, the one finger scrolling region, the one finger drag, the two finger drag, the generic gesture, the one finger edge swipe, the w-value, and the key-time. Specific functions may be related to the one finger tap, the two-three finger tap, the one-three finger count, the one finger scrolling region, the one finger drag, the two finger drag, the generic gesture, the one finger edge swipe, the w-value, and the key-time. Generic gestures may include but are not limited to a two finger pinch, a two finger rotate, a two finger swipe, a three swipe, and a four finger swipe.

Figure 5:
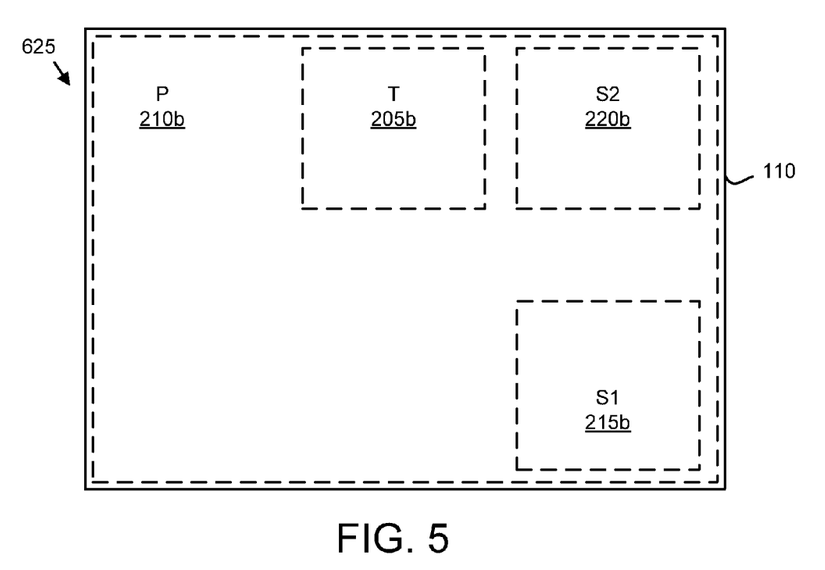
FIG. 5 is a top view drawing illustrating one embodiment of controls for an interim state.

FIG. 5 is a top view drawing illustrating one embodiment of interim controls 625 for the interim state 610. The interim controls 625 include a primary button control 210b, a tertiary control 205b, a first secondary button control 215b, and a second secondary button control 220b. The primary button control 210b may be equivalent to a primary mouse button such as a left mouse button. Each secondary button control 215b, 220b may be equivalent to a secondary mouse button such as a right mouse button. The tertiary control 205b may be equivalent to a tertiary mouse button such as a scroll wheel.

In addition, the generic gestures, the one finger edge swipe, and the w-value may be enabled. The one finger tap, the two-three finger tap, the one-three finger count, the one finger scrolling region, the one finger drag, and the two finger drag may be suppressed.

Figure 6:
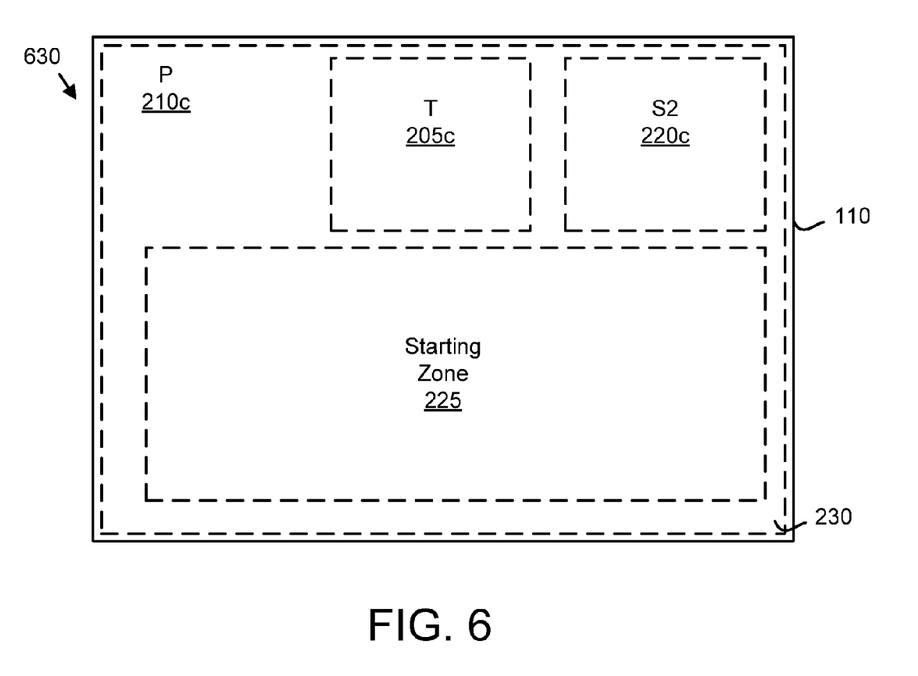
FIG. 6 is a top view drawing illustrating one embodiment of controls for a pointing state.

FIG. 6 is a top view drawing illustrating one embodiment of pointing controls 630 for a pointing state 615. The pointing controls 630 include a primary button control 210c, a tertiary control 205c, and a second secondary button control 220c. The primary button control 210c may be equivalent to a primary mouse button such as a left mouse button. The second secondary button control 220c may be equivalent to a secondary mouse button such as a right mouse button. The tertiary control 205c may be equivalent to a tertiary mouse button such as a scroll wheel.

The pointing control 630 further includes a starting zone 225 and a resting zone 230. In one embodiment, the resting zone 230 is the area of the touchpad 110 outside of the starting zone 225. The controls for the touchpad state 605, the interim state 610, and the pointer state 615 are listed in table 1.

TABLE 1

| Control | Touchpad State | Interim State | Pointer State |
|---|---|---|---|
| Primary Button | P 210a | P 210b | P 210c + Starting Zone 220 |
| Secondary Button | S1 215a | S1 215b + S2 220b | S2 220c |

TABLE 1-continued

| Control | Touchpad State | Interim State | Pointer State |
|---|---|---|---|
| | T 205a | T 205b | T 205c |
| Tertiary Button | | | |
| 1 Finger Tap | Enabled | Suppressed | Suppressed |
| 2-3 Finger Tap | Enabled | Suppressed | Suppressed |
| 1-3 Finger Count | Enabled | Suppressed | Suppressed |
| 1 Finger Scrolling Region | Enabled | Suppressed | Suppressed |
| 1 Finger Drag | Enabled | Suppressed | Suppressed |
| 2 Finger Drag | Enabled | Suppressed | Suppressed |
| Generic Gesture | Enabled | Enabled | Enabled |
| 1 Finger Edge Swipe | Enabled | Enabled | Enabled |
| W-Value | Enabled | Enabled | Enabled |
| Key-time | Enabled | Disabled | Disabled |
| Pointer Filtering | Disabled | Disabled | Disabled |

Besides the controls listed in the above table, other control functions may be associated with the pointer 105 and the touchpad 110, such as audio, haptic, and backlighting function controls.

Although the controls as depicted are similar in the touchpad state 605, the interim state 610, and the pointing state 615, the controls need not occupy the same area of the touchpad 110. For example, each of the primary button controls 210 may be disposed in a different area of the touchpad 110. Similarly, each secondary button control 215, 220 may be disposed in a different area of the touchpad 110 and each tertiary button control 205 may also be disposed in a different area of the touchpad 110.

Figure 7:
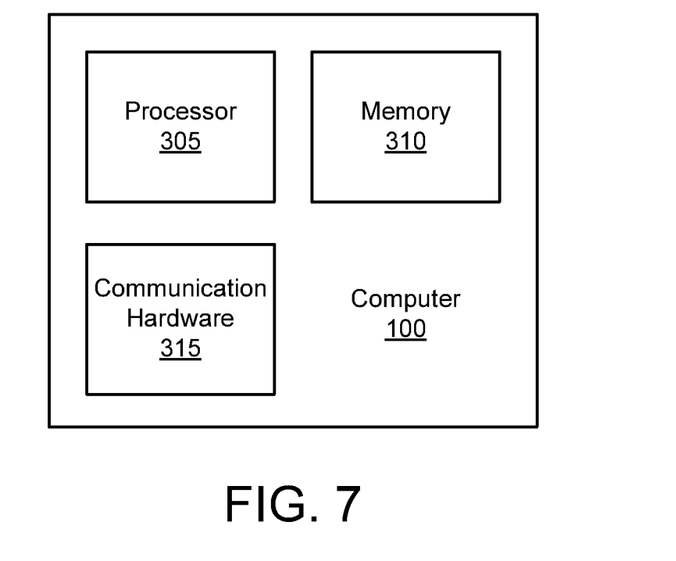
FIG. 7 is a schematic block diagram illustrating one embodiment of a computer.

FIG. 7 is a schematic block diagram illustrating one embodiment of a computer 100. The computer 100 may be the computer 100 of FIG. 1. The computer 100 includes a processor 305, a memory 310, and communication hardware 315. The memory 310 may be a computer readable storage medium such as a semiconductor storage device, a hard disk drive, an optical storage device, a micromechanical storage device, and combinations thereof. The memory 310 may store machine readable code. The processor 305 may execute the machine readable code. The communication hardware 315 may communicate with the touchpad 110 and the pointer 105.

In one embodiment, the communication hardware 315 receives position data indicating an absolute screen position, a relative motion on the screen, or combinations thereof from the touchpad 110 and/or the pointer 105. The communication hardware 315 may parse control activations and/or a cursor position from the position data. Alternatively, the pointer 105 and/or touchpad 110 may communicate the cursor position and/or the control activations to the communication hardware 315.

Figure 8:
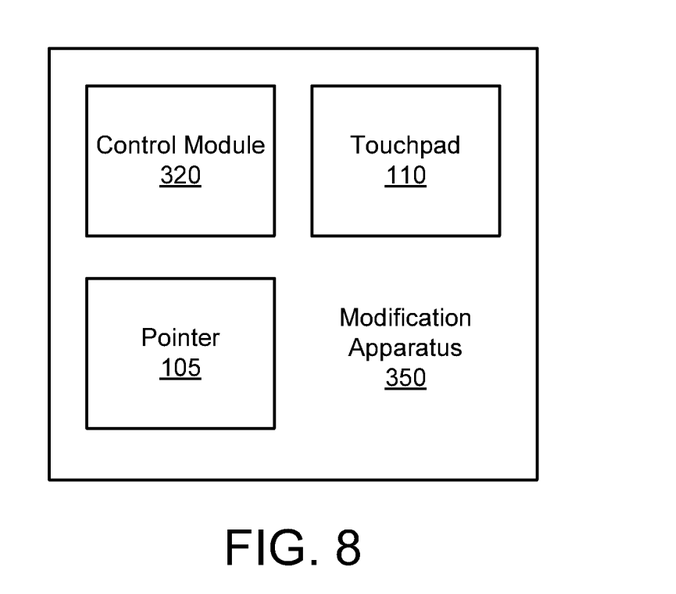
FIG. 8 is a schematic block diagram illustrating one embodiment of a modification apparatus.

FIG. 8 is a schematic block diagram illustrating one embodiment of a modification apparatus 350. The modification apparatus 350 includes a control module 320, the touchpad 110, and the pointer 105. Some functions of the control module 320, the touchpad 110, and the pointer 105 may be implemented hardware. In one embodiment, the control module 320 is at least partially embodied in a computer readable storage medium such as the memory 310. The computer readable storage medium may store machine readable code that when executed by the processor 305 performs the operations of the control module 320.

The control module 320 may determine the controls employed for the touchpad 110. In addition, the control module 320 may determine the control state 600. In one embodiment, the control module 320 employs the interim controls 625 in the interim state 610 for a touchpad 110 in response to detecting use of the pointer 105 embedded in the keyboard 115 in a touchpad state 605.

The control module 320 may further employ the pointing controls 630 in the pointing state 615 in response satisfying the pointing criteria in the interim state 610. In addition, the control module 320 may employ the touchpad controls 620 in the touchpad state 605 in response to satisfying touchpad criteria in the pointing state 615. The functions of the apparatus 350 will be described in greater detail in FIGS. 9-11.

Figure 9:
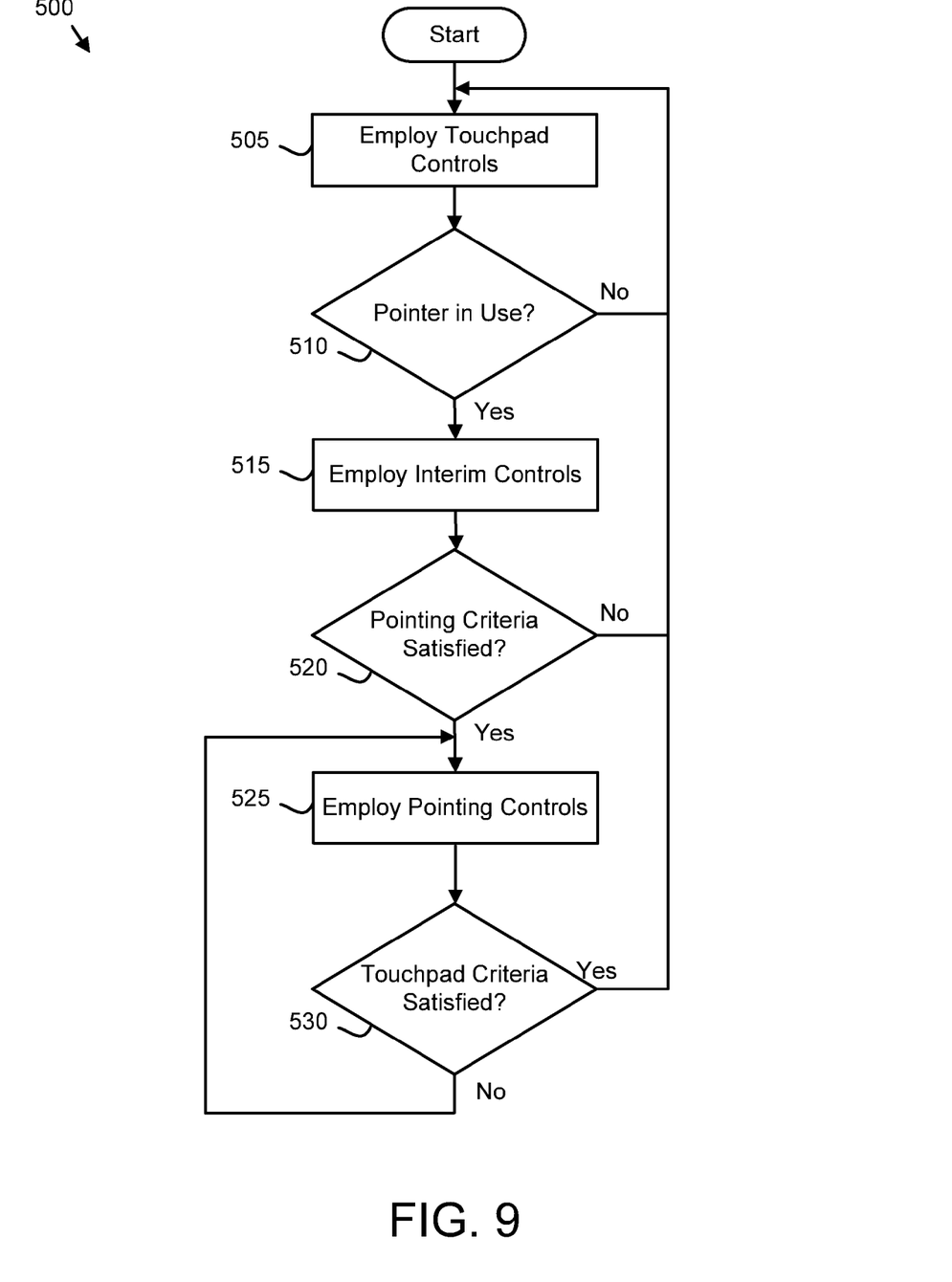
FIG. 9 is a schematic flow chart diagram illustrating one embodiment of a touchpad modification method.

FIG. 9 is schematic flow chart diagram illustrating one embodiment of a control modification method 500. The method 500 may perform the functions of the apparatus 350 and/or computer 100. The method 500 may be performed by the processor 305. In addition, the method 500 may be performed by machine readable code stored in a computer readable storage medium such as the memory 310.

The method 500 starts, and in one embodiment, the control module 320 employs 505 the touchpad controls 620 in the touchpad state 605 for the touchpad 110. For example, the touchpad controls 620 as described for FIG. 4 may be employed for the touchpad 110.

The control module 320 may determine 510 if the pointer 105 is in use. In one embodiment, the control module 320 determines 510 that the pointer 105 is in use if data is received from the pointer 105. Alternatively, the control module 320 determines 510 if the pointer 105 is in use if the pointer 105 indicates a change in cursor position. If the pointer 105 is not in use, the control module 320 continues to employ 505 the touchpad controls 620 in the touchpad state 605.

If the pointer 105 is in use, the control module 320 may employ 515 the interim controls 625 in the interim state 610 in response to detecting the use of a pointer 105. During the interim state 610, the control module 320 may determine 520 if pointing criteria are satisfied. In one embodiment, the pointing criteria are satisfied if the pointer 105 continues to be in use. The pointing criteria are described in more detail in FIG. 10.

If the pointing criteria are not satisfied, the control module 320 employs 505 the touchpad controls 620 in the touchpad state 605. If the pointing criteria are satisfied, the control module 320 may employ 525 the pointing controls 630 in the pointing state 615. While in the pointing state 615, the control module 320 may further determine 530 if touchpad criteria are satisfied. The touchpad criteria are described in more detail in FIG. 11.

If the touchpad criteria are satisfied, the control module 320 employs 505 the touchpad controls 620 in the touchpad state 605. If the touchpad criteria are not satisfied, the control module 320 continues to employ 525 the pointing controls 630 in the pointing state 615.

Thus the touchpad controls 620 are available to the user until the user begins to use the pointer 105. The interim controls 625 are then employed until it is determined whether the pointing criteria are satisfied, indicating that the user will likely use the pointer 105 for pointing functions. If the pointing criteria are not satisfied, the touchpad controls 620 are again available to the user. If the pointing criteria are satisfied, the pointing controls 630 are made available to the user until there is an indication of the user will use the touchpad 110 for pointing. In response to the indication that the user will use the touchpad 110 for pointing, the touchpad controls 620 are again made available to the user. Thus the embodiments automatically customize the controls for the touchpad 110 in response to the manner of the user employing the touchpad 110 and the pointer 105.

Figure 10:
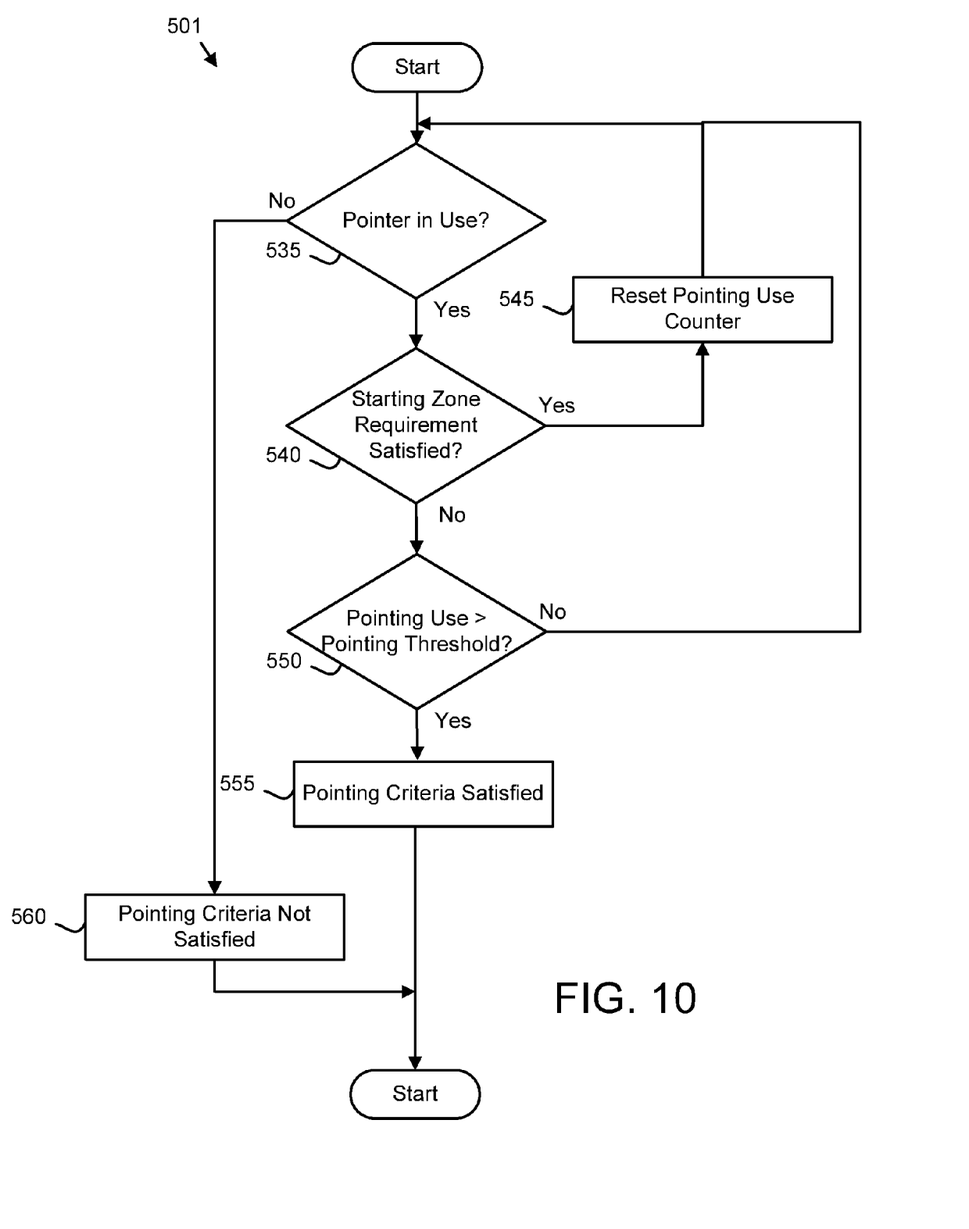
FIG. 10 is a schematic flowchart diagram illustrating one embodiment of a pointer criteria determination method.

FIG. 10 is a schematic flowchart diagram illustrating one embodiment of a pointer criteria determination method 501. The method 501 may be the pointing criteria satisfied step 520 of FIG. 9. The method 501 determines if the pointer criteria are satisfied. The method 501 may perform the functions of the apparatus 350 and/or computer 100. The method 501 may be performed by the processor 305. In addition, the method 501 may be performed by machine readable code stored in a computer readable storage medium such as the memory 310.

The method 501 starts, and in one embodiment the control module 320 determines 535 if the pointer 105 is in use. In one embodiment, the pointer 105 is in use if a pointing use counter does not equal zero. The pointing use counter may be checked after a specified time interval. Alternatively, the pointing use counter may be checked periodically in the course of program execution.

The control module 320 may set the pointing use counter to zero upon entering the interim state 605. The control module 320 may further increment the pointing use counter each time the pointer 105 is used. If the pointing use counter is not equal to zero, the pointer 105 may be determined 535 to be in use.

If the pointer 105 is not in use, the pointing criteria are not satisfied 560 and the method 501 ends. If the pointer 105 is in use, the control module 320 determines 540 if the starting zone requirement is satisfied. The starting zone requirement may be satisfied if only one first finger is on the touchpad 110 outside of the resting zone 230 and the first finger makes a motion within the starting zone 225 on the touchpad 110.

If the starting zone requirement is satisfied, the control module 320 may reset the pointing use counter to zero. The control module 320 may further determine 535 if the pointer 105 is in use.

If the starting zone requirement is not satisfied, the control module 320 may determine 550 if the pointing use counter exceeds a pointing threshold. In one embodiment, the pointing threshold is a nonzero number. If the pointing use counter does not exceed the pointing threshold, the control module 320 continues to determine 535 if the pointer 105 is in use.

If the pointing use counter exceeds the pointing threshold, the pointing criteria are satisfied 555 and the method 501 ends.

Figure 11:
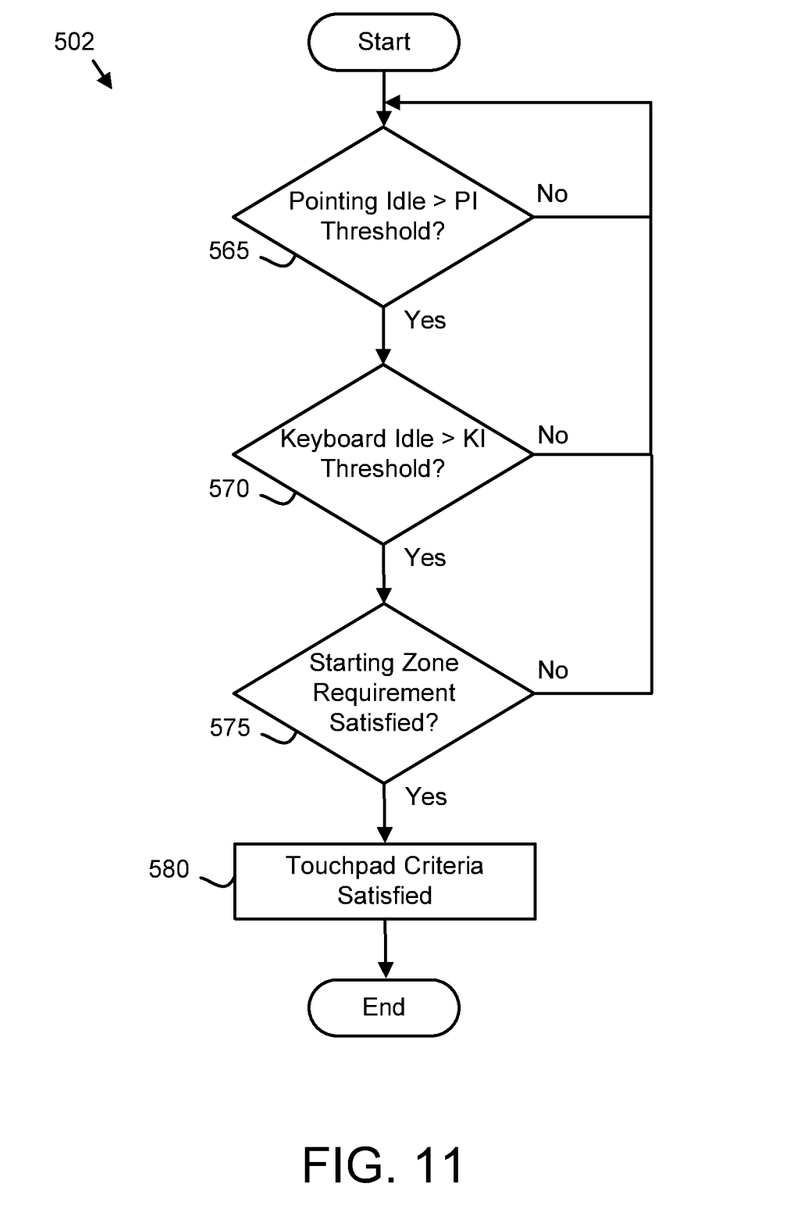
FIG. 11 is a schematic flowchart diagram illustrating one embodiment of a touchpad criteria determination method.

FIG. 11 is a schematic flowchart diagram illustrating one embodiment of a touchpad criteria determination method 502. The method 502 may be the touchpad criteria satisfied step 530 of FIG. 9. In one embodiment, the method 502 determines if the touchpad criteria are satisfied. The method 502 may perform the functions of the apparatus 350 and/or the computer 100. The method 502 may be performed by the processor 305. In addition, the method 502 may be performed by machine readable code stored in a computer readable storage medium such as the memory 310.

The method 502 starts, and in one embodiment the control module 320 determines 565 if a pointing idle exceeds a pointing idle threshold. In one embodiment, the pointing idle is a time interval from a last use of the pointer 105 to the current time. Alternatively, the pointing idle is a time interval from a second-to-last use of the pointer 105 to the last use of the pointer 105. The pointing idle threshold may be a time measured in seconds, milliseconds, or the like.

If the pointing idle does not exceed the pointing idle threshold, the control module 320 continues to determine 565 if the pointing idle is greater than the pointing idle threshold. If the pointing idle does exceed the pointing idle threshold, the control module 320 determines 570 if a keyboard idle exceeds a keyboard idle threshold. In one embodiment, the keyboard idle is a time interval from the last use of the keyboard 115 to the current time. Alternatively, the keyboard idle is a time interval from a second-to-last use of the keyboard 115 to a last use of the keyboard 115. The keyboard idle threshold may be a time measured in seconds, milliseconds, or the like.

If the keyboard idle does not exceed the keyboard idle threshold, the control module 320 continues to determine 565 if the pointing idle is greater than the pointing idle threshold. If the keyboard idle does exceed the keyboard idle threshold, the control module 320 may determine 575 if the starting zone requirement is satisfied. If the starting zone requirement is not satisfied, the control module 320 continues to determine 565 if the pointing idle is greater than the pointing idle threshold. If the starting zone requirement is satisfied, the touchpad criteria are satisfied 580 and the method 502 ends.

The touchpad criteria may prevent the control module 320 from employing the pointing controls 630 simply because the pointer 105 and the keyboard 115 are not in use. If the touchpad criteria are satisfied in the pointing state 615, the control module 320 modifies the controls of the touchpad 110 to employ the touchpad controls 620 in the touchpad state 605. However, as long as the touchpad criteria is not satisfied in the pointing state 615, the control module continues to employ the pointing controls 630 in the pointing state 615. Thus a user employing the pointer 105 4 pointing functions may have access to the pointing controls 630 until the touchpad 110 is again used as a pointing device. As a result, the functions of the touchpad 110 are automatically modified in accordance with the user's use of the pointer 105 and the touchpad 110.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory storing machine readable code executable executed by the processor to:
   employing interim controls in an interim state for a touchpad in response to detecting use of a pointer embedded between keys of a keyboard in a touchpad state, wherein the touchpad and the pointer each determine a position for a single cursor and the interim controls comprise a primary mouse button organized as a first area within the touchpad in the interim state, employing pointing controls in a pointing state in response to satisfying pointing criteria in the interim state, wherein the pointing controls comprise the primary mouse button organized as a second area within the touchpad in the pointing state and the pointing criteria are satisfied if pointing use exceeds a pointing threshold, and employing touchpad controls in the touchpad state in response to satisfying touchpad criteria in the pointing state, wherein the pointing controls comprise the primary mouse button organized as a third area within the touchpad in the touchpad state, wherein the third area is larger than the first area and the first area is larger than the second area, and the touchpad criteria are satisfied if a pointing idle exceeds a pointing idle threshold and a keyboard idle exceeds a keyboard idle threshold, the pointing idle is a time interval from a last use of the pointer, and the keyboard interval is a time interval from a last use of the keyboard.

2. The apparatus of claim 1, the control module further employing the touchpad controls in the touchpad state in response to not satisfying the pointing criteria in the interim state.

3. The apparatus of claim 1, wherein the pointing criteria are satisfied if both the touchpad is not used for pointing and the pointing use exceeds the pointing threshold.

4. The apparatus of claim 3, wherein the pointing criteria is satisfied if a starting zone requirement of the touchpad is not satisfied, wherein the starting zone requirement is satisfied if only one first finger is on the touchpad outside of a resting zone and the first finger makes a motion within a starting zone on the touchpad.

5. The apparatus of claim 4, wherein the touchpad criteria is satisfied if the starting zone requirement is satisfied and the third area is larger than the first area and the first area is larger than the second area.

6. The interim of claim 5, wherein the interim controls further comprise a first secondary mouse button, a second secondary mouse button, and a tertiary mouse control, the touchpad controls comprise the tertiary mouse control and the first secondary mouse button control, and the pointing controls comprise the tertiary mouse control and the second secondary mouse button control.

7. A method comprising:
  employing, by use of a processor, interim controls in an interim state for a touchpad in response to detecting use of a pointer embedded between keys of a keyboard in a touchpad state, wherein the touchpad and the pointer each determine a position for a single cursor and the interim controls comprise a primary mouse button organized as a first area within the touchpad in the interim state;
  employing pointing controls in a pointing state in response to satisfying pointing criteria in the interim state, wherein the pointing controls comprise the primary mouse button organized as a second area within the touchpad in the pointing state and the pointing criteria are satisfied if pointing use exceeds a pointing threshold; and
  employing touchpad controls in the touchpad state in response to satisfying touchpad criteria in the pointing state, wherein the pointing controls comprise the primary mouse button organized as a third area within the touchpad in the touchpad state, wherein the third area is larger than the first area and the first area is larger than the second area, and the touchpad criteria are satisfied if a pointing idle exceeds a pointing idle threshold and a keyboard idle exceeds a keyboard idle threshold, the pointing idle is a time interval from a last use of the pointer, and the keyboard interval is a time interval from a last use of the keyboard.

8. The method of claim 7, further comprising employing the touchpad controls in the touchpad state in response to not satisfying the pointing criteria in the interim state.

9. The method of claim 7, wherein the pointing criteria are satisfied if both the touchpad is not used for pointing and the pointing use exceeds the pointing threshold.

10. The method of claim 9, wherein the pointing criteria is satisfied if a starting zone requirement on the touchpad is not satisfied, wherein the starting zone requirement is satisfied if only one first finger is on the touchpad outside of a resting zone and the first finger makes a motion within a starting zone on the touchpad.

11. The method of claim 10, wherein the touchpad criteria is satisfied if the starting zone requirement is satisfied.

12. The method of claim 7, wherein the interim controls further comprise a first secondary mouse button, a second secondary mouse button, and a tertiary mouse control.

13. The method of claim 7, wherein the touchpad controls comprise a tertiary mouse control, and the first secondary mouse button control.

14. The method of claim 7, wherein the pointing controls comprise a tertiary mouse control, and the second secondary mouse button control.

15. A program product comprising a non-transitory computer readable storage medium storing machine readable code executed by a processor to perform the operations of:
  employing interim controls in an interim state for a touchpad in response to detecting use of a pointer embedded in a keyboard between keys of a touchpad state, wherein the touchpad and the pointer each determine a position for a single cursor and the interim controls comprise a primary mouse button organized as a first area within the touchpad in the interim state;
  employing pointing controls in a pointing state in response to satisfying pointing criteria in the interim state, wherein the pointing controls comprise the primary mouse button organized as a second area within the touchpad in the pointing state and the pointing criteria are satisfied if pointing use exceeds a pointing threshold; and
  employing touchpad controls in the touchpad state in response to satisfying touchpad criteria in the pointing state, wherein the pointing controls comprise the primary mouse button organized as a third area within the touchpad in the touchpad state, wherein the third area is larger than the first area and the first area is larger than the second area, and the touchpad criteria is satisfied if a pointing idle exceeds a pointing idle threshold and a keyboard idle exceeds a keyboard idle threshold, the pointing idle is a time interval from a last use of the pointer, and the keyboard interval is a time interval from a last use of the keyboard.

16. The program product of claim 15, the operations further comprising employing the touchpad controls in the touchpad state in response to not satisfying the pointing criteria in the interim state.

17. The program product of claim 15, wherein the pointing criteria are satisfied if both the touchpad is not used for pointing and the pointing use exceeds the pointing threshold.

18. The program product of claim 17, wherein the pointing criteria is satisfied if a starting zone requirement on the touchpad is not satisfied, wherein the starting zone requirement is satisfied if only one first finger is on the touchpad outside of a resting zone and the first finger makes a motion within a starting zone on the touchpad.

19. The program product of claim 18, wherein the touchpad criteria is satisfied if the starting zone requirement is satisfied.

20. The program product of claim 15, wherein the touchpad controls comprise tertiary mouse control and the first secondary mouse button control, and the pointing controls comprise the tertiary mouse control and the second secondary mouse button control.

* * * * *